United States Patent
Epaud et al.

(10) Patent No.: US 11,254,245 B2
(45) Date of Patent: Feb. 22, 2022

(54) VEHICLE SEAT WITH INCLINABLE SEATBACK

(71) Applicant: FAURECIA Sièges d'Automobile, Nanterre (FR)

(72) Inventors: David Epaud, Lardy (FR); Farouk Bouzid, Bretigny sur Orge (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/028,174

(22) Filed: Sep. 22, 2020

(65) Prior Publication Data

US 2021/0086664 A1 Mar. 25, 2021

(30) Foreign Application Priority Data

Sep. 23, 2019 (FR) ...................................... 1910450

(51) Int. Cl.
  *B60N 2/30* (2006.01)
  *B60N 2/02* (2006.01)

(52) U.S. Cl.
  CPC ........... *B60N 2/309* (2013.01); *B60N 2/0232* (2013.01); *B60N 2/3011* (2013.01); *B60N 2/3045* (2013.01); *B60N 2002/0236* (2013.01)

(58) Field of Classification Search
  CPC .... B60N 2/309; B60N 2/0232; B60N 2/3011; B60N 2/3045; B60N 2002/0236
  USPC ......................................................... 297/316
  See application file for complete search history.

(56) References Cited

U.S. PATENT DOCUMENTS

| | | | |
|---|---|---|---|
| 7,246,845 B2 * | 7/2007 | Rashidy | B60J 7/04 296/187.12 |
| 7,478,882 B2 * | 1/2009 | Fischer | B60N 2/206 297/340 |
| 2002/0060488 A1 * | 5/2002 | Delmas | B60N 2/164 297/344.16 |
| 2004/0160095 A1 * | 8/2004 | Swierczewski | B60N 2/4235 297/216.15 |
| 2006/0145524 A1 | 7/2006 | Fischer | |
| 2007/0018492 A1 | 1/2007 | Becker | |
| 2011/0316317 A1 * | 12/2011 | Sprenger | B60N 2/3065 297/344.1 |
| 2013/0001394 A1 * | 1/2013 | Calvert | B60N 2/36 248/429 |

(Continued)

FOREIGN PATENT DOCUMENTS

| | | |
|---|---|---|
| DE | 10123776 A1 | 11/2002 |
| FR | 2888790 A1 | 1/2007 |
| WO | 2004091963 A1 | 10/2004 |

*Primary Examiner* — Mark R Wendell
(74) *Attorney, Agent, or Firm* — Barnes & Thornburg LLP

(57) ABSTRACT

A vehicle seat comprising a seatback pivoting relative to a frame around the first transverse axis, a seat cushion pivoting relative to the seatback around a second transverse axis, a link pivoting relative to the seat cushion around a third transverse axis, wherein the link is further pivoting relative to the frame around a fourth transverse axis, a mechanism for releasing the angular position of the seatback relative to the frame around the first transverse axis, and an actuator, attached under the seat cushion. The angular position of the seatback relative to the frame released, the actuator commands a movement of the link relative to the seat cushion and consequently of the seatback relative to the seat cushion, from a comfort position of the seat to a flat floor position.

24 Claims, 3 Drawing Sheets

(56) References Cited

U.S. PATENT DOCUMENTS

| | | | |
|---|---|---|---|
| 2017/0197526 A1* | 7/2017 | Salvia, III | B60N 2/3047 |
| 2019/0092191 A1* | 3/2019 | Bouzid | B60N 2/309 |
| 2019/0152352 A1* | 5/2019 | Handigol | B60N 2/1695 |
| 2019/0152354 A1* | 5/2019 | Kapusky | B60N 2/3015 |
| 2019/0389335 A1* | 12/2019 | Epaud | B60N 2/206 |
| 2020/0001742 A1* | 1/2020 | Epaud | F16C 1/10 |
| 2020/0101869 A1* | 4/2020 | Bouzid | B60N 2/0232 |
| 2020/0101872 A1* | 4/2020 | Epaud | B60N 2/22 |
| 2020/0101873 A1* | 4/2020 | Cluet | B60N 2/14 |
| 2020/0122611 A1* | 4/2020 | Sekizuka | B60N 2/1615 |
| 2020/0331366 A1* | 10/2020 | Line | B60N 2/1695 |
| 2020/0398712 A1* | 12/2020 | Moulin | B60N 2/08 |

* cited by examiner

VEHICLE SEAT WITH INCLINABLE SEATBACK

PRIORITY CLAIM

This application claims priority to French Patent Application No. FR 19 10450, filed Sep. 23, 2019, which is expressly incorporated by reference herein.

BACKGROUND

The present disclosure relates to a vehicle seat.

SUMMARY

According to the present disclosure, a vehicle seat comprises a seatback, wherein the seatback is intended to be mounted pivoting relative to a frame around the first transverse axis;

a seat cushion, wherein the seat cushion is mounted pivoting relative to the seatback around a second transverse axis;

a link, wherein the link is mounted pivoting relative to the seat cushion around a third transverse axis, and wherein the link is further intended to be mounted pivoting relative to the frame around a fourth transverse axis;

a mechanism for releasing the angular position of the seatback relative to the frame around the first transverse axis; and an actuator, attached under the seat cushion, configured for, once the angular position of the seatback relative to the frame is released, commanding a movement of the link relative to the seat cushion and consequently of the seatback relative to the seat cushion, for switching from a comfort position of the seat to a flat floor position of the seat.

In illustrative embodiments, the attachment of the actuator under the seat cushion serves to produce a particularly simple, robust and compact configuration of the seat.

In illustrative embodiments, the seat comprises one or more of the following characteristics, taken alone or in combination:

the actuator comprises an actuator body attached to the seat cushion, and a rod intended to be moved relative to the actuator body along a longitudinal direction;

the actuator body is mounted rotatably relative to the seat cushion, around a sixth transverse axis;

the actuator body is mounted freely in rotation around the sixth transverse axis in a support, wherein the support is rigidly attached, directly or indirectly to the seat cushion;

the support is rigidly attached to the seat cushion via a first short-link, wherein the first short-link is preferably rigidly attached to a crosspiece, wherein said crosspiece is preferably also rigidly attached, at the ends thereof, to the seat cushion by means of arms;

the actuator body comprises a stator of a motor, the rotation of the rotor of the motor relative to the stator around a seventh axis causing a movement of the rod along a longitudinal direction;

the seventh axis, of rotation of the rotor of the motor, is transverse, wherein the seventh axis is preferably distinct from the sixth transverse axis;

the seventh axis, of rotation of the rotor of the motor, extends along the longitudinal direction, wherein the seventh axis extends preferably in the extension of the rod;

the stator of the motor is mounted rotating in the support around the sixth transverse axis;

the actuator body also comprises a set of gears interposed between the motor and the rod;

the set of gears is received in a box, wherein the box is preferably mounted in the support, rotatably around the sixth transverse axis, and wherein the box and the stator of the motor are, again preferably, rigidly attached to each other;

the actuator is a jack wherein the actuator body preferably comprises the cylinder of the jack;

one end of the rod is mounted freely in rotation relative to the link around the fifth transverse axis;

the end of the rod is mounted freely in rotation around the fifth transverse axis relative to a second short-link, wherein the second short-link is rigidly attached to the link, directly or indirectly, preferably through a second crosspiece rigidly attached to the link;

the rod is a screw, preferably an endless screw;

the seatback is mounted pivoting relative to the frame by means of a hinge mechanism for adjusting the angular position of the seatback, wherein the hinge mechanism is mobile between at least one locked position where the seatback is immobilized relative to the frame and an unlocked position where the seatback can pivot freely relative to the frame about the first transverse axis, and wherein the mechanism for releasing the angular position of the seatback relative to the frame is suited for commanding the movement of the hinge mechanism from the at least one locked position to the unlocked position;

the seatback is mounted pivoting freely relative to the frame, wherein a locking device allows selectively locking or unlocking the rotation of the seatback relative to the frame, and wherein the mechanism for disengaging is suited for commanding the locking device;

in the comfort position of the seat, the link, seat cushion and seatback form a "Z";

in the flat floor position of the seat, the seat cushion and the link extend substantially one in the extension of the other;

in the flat floor position of the seat, the seatback extends facing the seat cushion and/or the link;

the seat further comprises the frame;

the actuator, in particular the motor for the actuator, as applicable, is arranged between the seat cushion and the frame; and the seat comprises two links each disposed on one respective side of the seat, wherein the two links are secured by means of a crosspiece, and wherein the actuator is connected to the cross piece.

In illustrative embodiments, a method is described for placing a seat such as described above in all combinations thereof into a flat floor, from a comfort position of the seat adapted to receiving an occupant of the seat, comprising the steps of releasing the rotation of the seatback relative to the frame and using the actuator for moving the link relative to the seat cushion and consequently the seatback relative to the seat cushion so as to shift from said one comfort position of the seat to the flat floor position of the seat.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the various figures, the same references designate identical or similar items.

In the description which follows, the indications for spatial positioning such as top, bottom, upper, lower, horizontal, vertical, etc. are given for clarity of the exposition, according to the usual position of use of the seat, but are not limiting. More specifically, the orientations relative to the front and rear of the seat are relative to the usual position of use of the seat.

In particular, a transverse direction is understood to mean any direction extending from one lateral side of the seat towards the other lateral side of the seat. In one example, a transverse direction is horizontal.

The longitudinal direction is understood to mean any direction oriented from the front of the seat towards the rear of the seat. In particular, a longitudinal direction can be included in a plane normal to a transverse direction. Thus, a longitudinal direction may comprise a vertical component.

Figure 1:
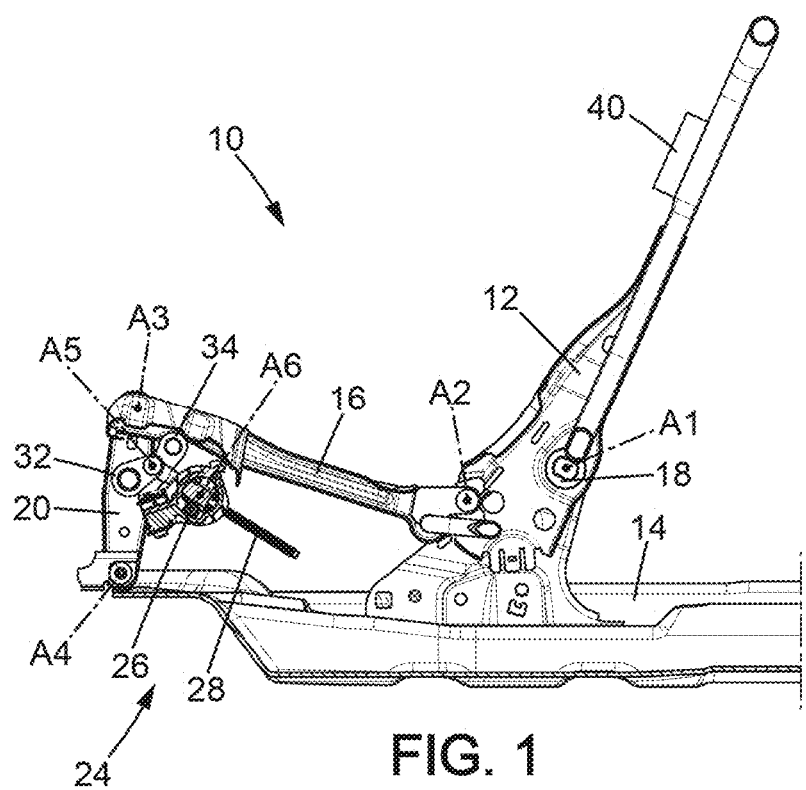
FIG. 1 is a schematic view in longitudinal section of an automotive vehicle seat, in comfort position.

Reference is now made to FIG. 1.

FIG. 1 shows an automotive vehicle seat 10 which comprises the seatback 12 mounted on a frame 14, and a seat cushion 16. The seat in question can for example be a rear seat, in particular a seat for a third row of seats, but could also be a front seat or a rear seat for a second row of seats. The frame 14 can be attached to the floor of a vehicle, in particular of an automotive vehicle. Alternatively, the frame 14 is formed by the floor of the vehicle, in particular of an automotive vehicle.

The seatback 12 is mounted pivoting relative to the frame 14 around a first transverse axis A1. For example, a hinge mechanism 18 is disposed between the seatback 12 and the frame 14, in order to allow or command pivoting of the seatback 12 relative to the frame, around the first transverse axis A1. The hinge mechanism 18 can in particular lock or immobilize the seatback 12 relative to the frame 14, around the first transverse axis A1, and a plurality of locked positions, described as comfort positions. A comfort position is a position suited for receiving an occupant 10 by the seat. The hinge mechanism 18 may allow such an adjustment in a plurality of locked positions over a first angular range. Beyond this first angular range, for example, the hinge mechanism 18 can have an unlocked or disengaged position, in which the seatback 12 rotates freely relative to the frame 14, around a first transverse axis A1. This rotational freedom of the seatback 12 around the first transverse axis is however only provided over a second angular range distinct from the first angular range in which the hinge mechanism 18 allows immobilizing the seatback 12 in a plurality of locked comfort positions. Thus a rotation of the seatback 12 around the first transverse axis A1 allows shifting selectively from locked or engaged positions of the articulation mechanism 18, allowing the adjustment of the angular position of the seatback 12, to an unlocked or disengaged position, in which the seatback 12 is rotationally free relative to the frame 14, around the first transverse axis A1.

Further the seat cushion 16 is mounted pivoting relative to the seatback 12 around a second transverse axis A2. Here, the seat cushion 16 is mounted pivoting relative to the seatback 12 in the area of the first longitudinal end of the seat cushion 16. The first longitudinal end of the seat cushion 16 corresponds to the end oriented towards the rear in normal position of the seat 10.

The seat 16 is also mounted pivoting relative to a link 20, around the third transverse axis A3. In the example shown, the seat cushion 16 is in fact mounted pivoting relative to two links 20 around a single third transverse axis A3. The two links 20 are disposed on each side of the seat 16 in the area of the second longitudinal end of the seat 16, opposite the first longitudinal end. The two links 20 are secured by means of a connection element 22. The connection element 22 for example has the shape of a first crosspiece 22.

Each link 20 is additionally mounted pivoting relative to the frame 14 around a fourth transverse axis A4.

The seat 10 again comprises an actuator 24. The actuator 24 comprises essentially an actuator body 25 and a rod 28. The actuator body 25 is mounted rotating around a sixth transverse axis A6 relative to the seat cushion 16. The seat 28 is intended to be moved relative to the actuator body 25 along the longitudinal direction A8.

In the case at hand, the actuator body 25 comprises a motor 26 driving a rod 28 in screw form, here an endless screw 28. The endless screw 28 moves, under the action of the rotation of the motor 26, substantially along the longitudinal direction A8. The longitudinal direction A8 may comprise a vertical component. In particular, the endless screw 28 moves along the direction of extension A8 thereof, which can vary by rotation of the endless screw 28 around a transverse axis A7. The end of the endless screw 28 is here provided with the connection head 30, mounted pivoting relative to the link 20, around a fifth transverse axis A5. More precisely, here, the connection head 30 at the end of the endless screw 28 is mounted pivoting relative to a first short-link 32 around the fifth transverse axis A5. The first short-link 32 is additionally rigidly attached to the link 20. Still more precisely, the first short-link 32 is here rigidly attached to the first crosspiece 22 between the two links 20.

The motor 26, in particular the stator 27 of the motor 26, is connected to a second short-link 34, itself rigidly attached to the seat cushion 16. In the case at hand, the second short-link 34 is rigidly attached to a second crosspiece 36 extending under the seat cushion 16 and attached, at each of the two ends thereof, to a respective lateral side of the seat cushion 16, by an arm 42. Further, the endless screw 28 and the motor 26 are able to pivot around a sixth transverse axis A6 relative to the seat cushion 16. The sixth transverse axis A6 is distinct from the axis A7 of rotation of the motor 26.

Here, the endless screw 28 is connected to the outlet shaft of the motor 26 by means of a suitable set of gears 38 allowing the endless screw 28 to move along the longitudinal direction A8, when the motor 26 turns around the axis A7 thereof. Here, it is understood by "the motor 26 turns around the axis A7 thereof" that the rotor of the motor 26 turns around the axis A7 relative to the stator 27 of the motor 26. The longitudinal direction A8 here corresponds to the "instantaneous" direction of extension of the endless screw 28, which varies because of the rotation of the endless screw 28 relative to the seat cushion 16, around the sixth transverse axis A6.

Figure 2:
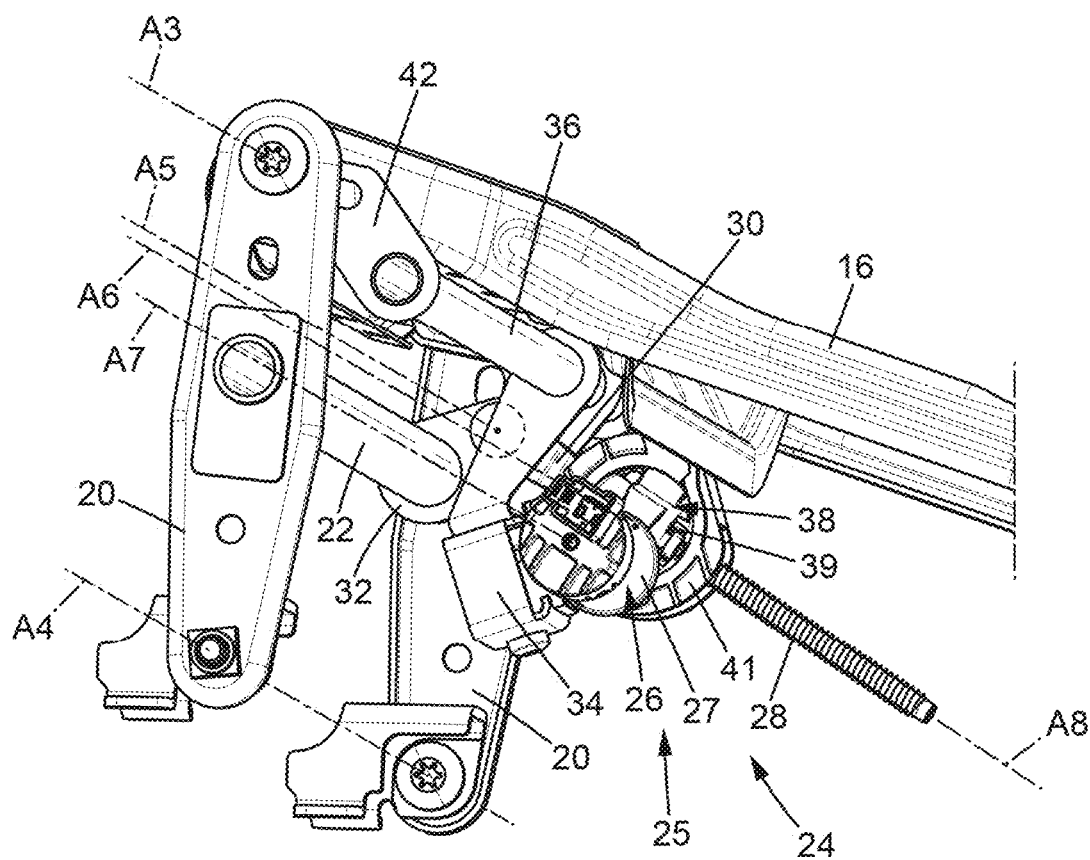
FIG. 2 is a perspective schematic view of a detail of the seat from FIG. 1.

As shown in FIG. 2, the motor 26, more precisely the stator 27, is rigidly attached to a box 39 receiving the set of gears 38. The box 39 and the set of gears are here part of the actuator body 25. The box 39 is received in a support 41 such that the box 39 can pivot relative to the support 41 around the sixth transverse axis A6. Here, the support 41 takes the form of a ring clamp 41. The support 41 is indirectly rigidly attached to the seat cushion 16. In the case at hand, the support 41 is in fact rigidly attached to the second short-link 34. The second short-link 34 is rigidly attached to the seat cushion 16, in the case in hand via the second crosspiece 36 and two arms 42, rigidly attached respectively to one end of the second crosspiece 36 and also to the seat cushion 16. The support 41 comprises lateral openings allowing the passage of the endless screw A8. The box 39 also comprises lateral openings allowing the passage of the endless screw 28. The openings in the box 39 guide the displacement of the endless screw 28 along the longitudinal direction A8. In the example shown, the box 39 is thus mounted rotating around the sixth transverse axis A6, relative to the support 41. The endless screw 28 and the motor 26 are secured in rotation around the sixth transverse axis A6, with the box 39.

Finally, the seat 10 comprises a mechanism 40 for releasing the angular position of the seatback 12 relative to the frame 14, meaning in order to allow the seatback 12 to pivot freely relative to the frame 14 about the first transverse axis A1. In the case at hand, for releasing the angular position of the seatback 12 relative to the frame 14, this mechanism 40 commands a rotation of the hinge mechanism 18 beyond the first angular range in which the hinge mechanism keeps the position of the seatback 12 locked relative to the frame 14. The mechanism 40 is mechanically commanded or, preferably electrically commanded.

Figure 4:
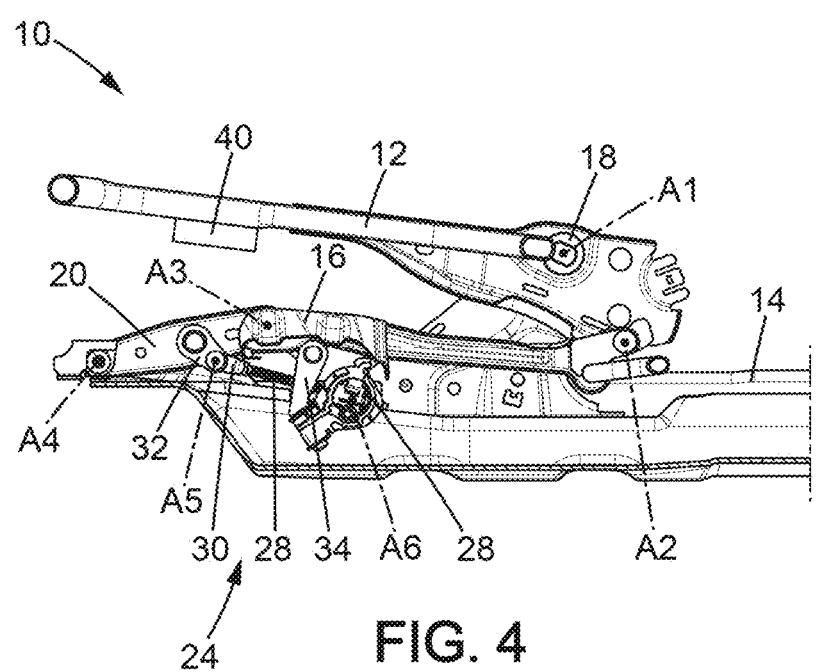
FIG. 4 is a schematic view in longitudinal section of the seat from FIG. 1 in a flat floor position.

The seat 10 allows easily shifting from a comfort position of the seat, such as shown by FIGS. 1 and 2, to a flat floor position, as shown in FIG. 4.

In a comfort position of the seat 10, as can be seen in FIG. 1, in particular, the link(s) 20, the seat cushion 16 and the seatback 12 substantially form a "Z" in side view.

From this comfort position from FIG. 1, the release of the rotation of the seatback 12 relative to the frame 14 is commanded. To do that, the mechanism 40 commands the rotation of the seatback 12 beyond the first angular range in which the hinge mechanism 18 is able to keep the seatback 12 in angular position relative to the frame 14.

Once this position of the seatback 12 is reached, the actuator 24 is used for commanding a movement of the link(s) 20 relative to the seat cushion 16. In the case at hand, the actuator 24 is commanded so as to move the endless screw 28 towards the front of the seat 10.

Figure 3:
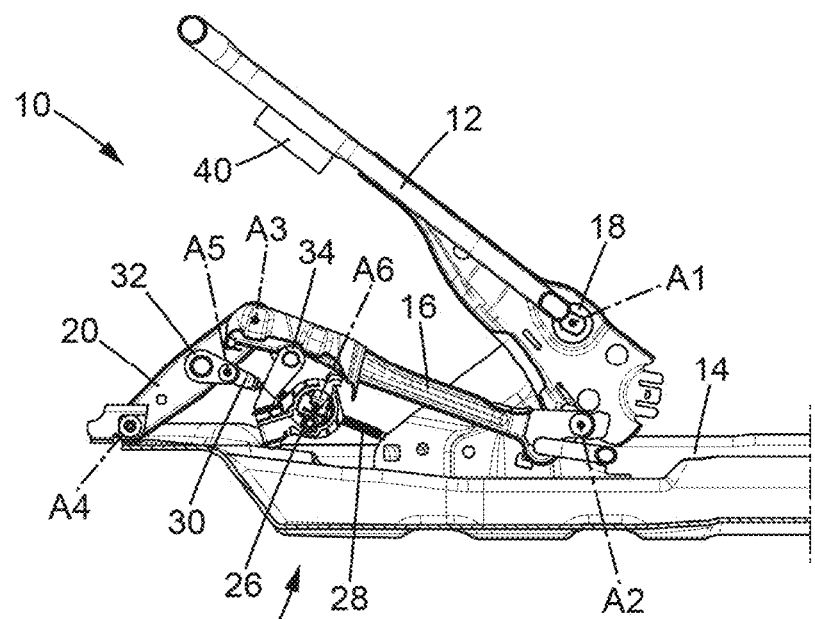
FIG. 3 is a schematic view in longitudinal section of the seat from FIG. 1, in an intermediate position between the comfort position from FIG. 1 and the flat floor position from FIG. 4.

The seat 10 then passes through the intermediate position shown in FIG. 3. As can be seen in this figure, the forward movement of the endless screw 28 relative to the motor 26 causes an increase of the angle between the link(s) 20 on one side and the seat cushion 16 on the other. This angle thus tends to flatten.

Further, the end of the link(s) 20 pivoting around the fourth transverse axis A4 of the seat cushion 16 is moved substantially towards the rear of the seat 10. This movement of the seat cushion 16 towards the rear causes the pivoting of the seatback 12 relative to the frame 14, around the first transverse axis A1, wherein the seatback 12 is directed towards the seat cushion 16 and the link(s) 20.

The movement of the seatback 12, the seat cushion 16 and the link(s) 20 continues until reaching the low floor position shown in FIG. 4. As can be seen in this FIG. 4, in this low-floor position of the seat 10:

the seatback 12 is substantially horizontal;

the link(s) 20 extend in the extension of the seat cushion 16, in side view;

the seatback 12 extends opposite (or facing) the seat cushion 16 and the link(s) 20, in side view.

The lower floor position of the seat 10 corresponds to a particularly compact configuration of the seat 10 which can allow increasing the trunk of the vehicle, in particular when the seat 10 is a seat for a second or third row of seats.

To move from the flat floor position in FIG. 4 to a comfort position, the movement of the endless screw 28 in the opposite direction is commanded until the seatback 12 reaches an angular position in which the hinge mechanism 18 is able to lock the seatback 12. The inclination of the seatback 12 can then be adjusted conventionally, by using the hinge mechanism 18.

Thus, the seat 10 shown in the figures constitutes a particularly simple and robust configuration which can provide an electric command for moving from a comfort position to a flat floor position, and vice versa.

Further, the configuration of the seat 10 is particularly attractive because the actuator 24 used is attached under the seat cushion 16 of the seat 10. In other words, the actuator 24 is located under the seat cushion 16 and is attached to the seat cushion 16. Such a configuration is particularly compact and small size. This compact configuration is particularly well suited to a rear seat, in particular a seat for a third row of a vehicle. As can be seen in FIG. 4, the actuator can further be fully or at least partially received in a suitable housing formed by the frame, at least in the flat floor position of the seat.

It can be noted that all the transverse axes A1-A7 are distinct in the example shown. Additionally, the seat 10 described has no mechanical link at all between these constituent elements including the frame 14 aside from those already described.

The present disclosure is not limited to the example described above with reference to the figures. The present disclosure in contrast does encompass all the variants which could be conceived by the person skilled in the art in the scope of the protection sought.

For example, the seat might not have any hinge mechanism 18. In its place, the seat may be mounted pivoting freely relative to the frame about a first transverse axis, and the seat may comprise a locking device with which to selectively lock and unlock the rotation of the seatback relative to the frame. The mechanism for releasing the angular position of the seatback relative to the seat is then suited to commanding the locking mechanism. It should be noted that the locking mechanism can be suited to lock the seatback in any angular position relative to the frame, in a finite number of angular positions, or even in a single angular position of the seatback relative to the frame. In this last case, the seat and the seatback have a single comfort position suited to receiving an occupant in said nominal position.

Further, other actuators than those described above can be used. In particular, a rack and pinion actuator can be used. In this case, the actuator body comprises a motor rotating a pinion and the rod takes the form of a rack whose movement is controlled by the rotation of the pinion. A jack can also be implemented in place of the actuator described above. In this case, the actuator body comprises the body or cylinder of the jack. In this case as well, the rod of the actuator may comprise a rod or a slider secured to a piston of the jack, as applicable.

In each case, the actuator body can be mounted rotating around the sixth transverse axis relative to the seat cushion. Further, in the example described above, it is the box for the set of gears which is received in the support 41, so as to be able to turn around the sixth transverse axis. Alternatively, the motor 26, in particular the stator 27 of the motor 26, can be mounted in the support 41, so as to be able to pivot around the sixth transverse axis A6.

The configuration of the attachment of the head of the endless screw to the link 20 is also not limited to just the example described above. The configuration of the attachment of the first short-link 32 to the link 20 can also be different from that described above. The first short-link 32 can in fact be attached directly to the link 20, or indirectly by using more or fewer parts than in the example described above.

Similarly, the configuration of the attachment of the actuator body 25 and/or the support 41 to the seat cushion 16 is not limited to just the example described above. The support 41 can in particular be attached directly to the seat cushion 16. Alternative, the support 41 can be attached indirectly to the seat cushion 16 by using more or fewer parts than in the example described above with reference to the figures.

The person skilled in the art can in fact identify many variants to the configurations described.

According to another variant, the motor for the actuator is disposed such that the axis of rotation of the rotor relative to the stator is oriented along a longitudinal direction, in particular along, meaning parallel to, the direction of extension of the rod. In particular, the axis of rotation of the motor can be coincident with the direction of extension of the rod. In this case, the motor extends in the extension of the rod of the actuator. A set of gears can also be provided in this case, between the motor and the rod of the actuator.

A vehicle seat includes a seatback that can be folded-down forward horizontally. Movement of all or part of the seat may be controlled by command devices. Comparative command devices generally have large dimensions.

The present disclosure aims to improve the comparative seats.

For this purpose, a vehicle seat is described comprising:

a seatback, wherein the seatback is intended to be mounted pivoting relative to a frame around the first transverse axis;

a seat cushion, wherein the seat cushion is mounted pivoting relative to the seatback around a second transverse axis;

a link, wherein the link is mounted pivoting relative to the seat cushion around a third transverse axis, and wherein the link is further intended to be mounted pivoting relative to the frame around a fourth transverse axis;

a mechanism for releasing the angular position of the seatback relative to the frame around the first transverse axis; and an actuator, attached under the seat cushion, configured for, once the angular position of the seatback relative to the frame is released, commanding a movement of the link relative to the seat cushion and consequently of the seatback relative to the seat cushion, for switching from a comfort position of the seat to a flat floor position of the seat.

Thus, the attachment of the actuator under the seat cushion serves to produce a particularly simple, robust and compact configuration of the seat.

According to embodiments in accordance with the present disclosure, the seat comprises one or more of the following characteristics, taken alone or in combination:

the actuator comprises an actuator body attached to the seat cushion, and a rod intended to be moved relative to the actuator body along a longitudinal direction;

the actuator body is mounted rotatably relative to the seat cushion, around a sixth transverse axis;

the actuator body is mounted freely in rotation around the sixth transverse axis in a support, wherein the support is rigidly attached, directly or indirectly to the seat cushion;

the support is rigidly attached to the seat cushion via a first short-link, wherein the first short-link is preferably rigidly attached to a crosspiece, wherein said crosspiece is preferably also rigidly attached, at the ends thereof, to the seat cushion by means of arms;

the actuator body comprises a stator of a motor, the rotation of the rotor of the motor relative to the stator around a seventh axis causing a movement of the rod along a longitudinal direction;

the seventh axis, of rotation of the rotor of the motor, is transverse, wherein the seventh axis is preferably distinct from the sixth transverse axis;

the seventh axis, of rotation of the rotor of the motor, extends along the longitudinal direction, wherein the seventh axis extends preferably in the extension of the rod;

the stator of the motor is mounted rotating in the support around the sixth transverse axis;

the actuator body also comprises a set of gears interposed between the motor and the rod;

the set of gears is received in a box, wherein the box is preferably mounted in the support, rotatably around the sixth transverse axis, and wherein the box and the stator of the motor are, again preferably, rigidly attached to each other;

the actuator is a jack wherein the actuator body preferably comprises the cylinder of the jack;

one end of the rod is mounted freely in rotation relative to the link around the fifth transverse axis;

the end of the rod is mounted freely in rotation around the fifth transverse axis relative to a second short-link, wherein the second short-link is rigidly attached to the link, directly or indirectly, preferably through a second crosspiece rigidly attached to the link;

the rod is a screw, preferably an endless screw;

the seatback is mounted pivoting relative to the frame by means of a hinge mechanism for adjusting the angular position of the seatback, wherein the hinge mechanism is mobile between at least one locked position where the seatback is immobilized relative to the frame and an unlocked position where the seatback can pivot freely relative to the frame about the first transverse axis, and wherein the mechanism for releasing the angular position of the seatback relative to the frame is suited for commanding the movement of the hinge mechanism from the at least one locked position to the unlocked position;

the seatback is mounted pivoting freely relative to the frame, wherein a locking device allows selectively locking or unlocking the rotation of the seatback relative to the frame, and wherein the mechanism for disengaging is suited for commanding the locking device;

in the comfort position of the seat, the link, seat cushion and seatback form a "Z";

in the flat floor position of the seat, the seat cushion and the link extend substantially one in the extension of the other;

in the flat floor position of the seat, the seatback extends facing the seat cushion and/or the link;

the seat further comprises the frame;

the actuator, in particular the motor for the actuator, as applicable, is arranged between the seat cushion and the frame; and the seat comprises two links each disposed on one respective side of the seat, wherein the two links are secured by means of a crosspiece, and wherein the actuator is connected to the cross piece.

According to another aspect of the present disclosure, a method is described for placing a seat such as described above in all combinations thereof into a flat floor, from a comfort position of the seat adapted to receiving an occupant of the seat, comprising the steps of releasing the rotation of the seatback relative to the frame and using the actuator for moving the link relative to the seat cushion and consequently the seatback relative to the seat cushion so as to shift from said one comfort position of the seat to the flat floor position of the seat.

The invention claimed is:

1. A vehicle seat comprising:
a seatback, wherein the seatback configured to be mounted for pivotable movement relative to a frame around a first transverse axis;
a seat cushion, wherein the seat cushion is mounted for pivotable movement relative to the seatback around a second transverse axis;
a link mounted for pivotable movement relative to the seat cushion around a third transverse axis, wherein the link is further configured to be mounted for pivotable movement relative to the frame around a fourth transverse axis;
a mechanism for releasing the angular position of the seatback relative to the frame around the first transverse axis; and
an actuator attached under the seat cushion and configured to, once the angular position of the seatback relative to the frame is released, cause movement of the link relative to the seat cushion and consequently of the seatback relative to the seat cushion, for switching the vehicle seat from a comfort position to a flat floor position.

2. The vehicle seat of claim 1, wherein the seatback is mounted pivoting relative to the frame by means of a hinge mechanism for adjusting the angular position of the seatback, wherein the hinge mechanism is mobile between at least one locked position where the seatback is immobilized relative to the frame and an unlocked position where the seatback can pivot freely relative to the frame about the first transverse axis, and wherein the mechanism for releasing the angular position of the seatback relative to the frame is suited for commanding the movement of the hinge mechanism from the at least one locked position to the unlocked position.

3. The vehicle seat of claim 1, wherein the seatback is mounted pivoting freely relative to the frame, wherein a locking device allows selectively locking or unlocking the rotation of the seatback relative to the frame, and wherein the mechanism for disengaging is suited for commanding the locking device.

4. The vehicle seat of claim 1, wherein in the comfort position of the seat, the link, seat cushion and seatback form a "Z".

5. The vehicle seat of claim 1, wherein, in the flat floor position of the seat, the seat cushion and the link extend substantially one in the extension of the other.

6. The vehicle seat of claim 1, wherein, in the flat floor position of the seat, the seatback extends facing at least one among the seat cushion and the link.

7. The vehicle seat of claim 1, further comprising the frame.

8. The vehicle seat of claim 7, wherein the actuator is arranged between the seat cushion and the frame.

9. The vehicle seat of claim 1, comprising two links each disposed on one respective side of the seat, wherein the two links are secured by means of a crosspiece, and wherein the actuator is connected to the cross piece.

10. A method for placing the seat according to claim 1 into the flat floor position from the comfort position, the method comprising the steps of
releasing the rotation of the seatback relative to the frame and using the actuator for moving the link relative to the seat cushion and consequently the seatback relative to the seat cushion so as to shift from said comfort position of the seat to the flat floor position of the seat.

11. A vehicle seat comprising:
a seatback, wherein the seatback configured to be mounted for pivotable movement relative to a frame around a first transverse axis;
a seat cushion, wherein the seat cushion is mounted for pivotable movement relative to the seatback around a second transverse axis;
a link mounted for pivotable movement relative to the seat cushion around a third transverse axis, wherein the link is further configured to be mounted for pivotable movement relative to the frame around a fourth transverse axis;
a mechanism for releasing the angular position of the seatback relative to the frame around the first transverse axis; and
an actuator attached under the seat cushion and configured to, once the angular position of the seatback relative to the frame is released, cause movement of the link relative to the seat cushion and consequently of the seatback relative to the seat cushion, for switching the vehicle seat from a comfort position to a flat floor position,
wherein the actuator comprises an actuator body attached to the seat cushion, and a rod configured to move relative to the actuator body along a longitudinal direction.

12. The vehicle seat of claim 11, wherein the actuator body is mounted rotatably relative to the seat cushion around a sixth transverse axis.

13. The vehicle seat of claim 11, wherein the actuator body is mounted freely in rotation around the sixth transverse axis in a support, wherein the support is rigidly attached, directly or indirectly, to the seat cushion.

14. The vehicle seat of claim 13, wherein the support is rigidly attached to the seat cushion via a first short-link.

15. The vehicle seat of claim 11, wherein the actuator body comprises a stator of a motor, the rotation of a rotor of the motor relative to the stator around a seventh axis causing a movement of the rod along the longitudinal direction.

16. The vehicle seat of claim 15, wherein the seventh axis, of rotation of the rotor of the motor, is transverse.

17. The vehicle seat of claim 15, wherein the seventh axis, of rotation of the rotor of the motor, extends along the longitudinal direction.

18. The vehicle seat of claim 15, wherein the stator of the motor is mounted rotating in the support around the sixth transverse axis.

19. The vehicle seat of claim 15, wherein the actuator body also comprises a set of gears interposed between the motor and the rod.

20. The vehicle seat of claim 19, wherein the set of gears is received in a box, wherein the box is mounted in the support, rotatably around the sixth transverse axis.

21. The vehicle seat of claim 11, wherein the actuator is a jack.

22. The vehicle seat of claim 11, wherein one end of the rod is mounted freely in rotation relative to the link around the fifth transverse axis.

23. The vehicle seat of claim 22, wherein the end of the rod is mounted freely in rotation around the fifth transverse axis relative to a second short-link, wherein the second short-link is rigidly attached to the link, directly or indirectly.

24. The vehicle seat of claim 11, wherein the rod is one among a screw and an endless screw.

\* \* \* \* \*